(12) United States Patent
Kansteiner et al.

(10) Patent No.: US 11,180,882 B2
(45) Date of Patent: Nov. 23, 2021

(54) ARRANGEMENT COMPRISING A VISIBLE SEAM AND A LIGHTING APPARATUS, USE THEREOF, AND METHOD FOR PRODUCING THE ARRANGEMENT

(71) Applicant: Inteva Products Europe GmbH, Solingen (DE)

(72) Inventors: Udo Kansteiner, Witten (DE); Frank Blockhaus, Velbert (DE); Julia Schmidt, Esslingen (DE); Holger Wagner, Duisburg (DE); Christoph Riethmueller, Leonberg (DE); Benjamin Pohl, Stuttgart (DE)

(73) Assignee: INTEVA PRODUCTS EUROPE GMBH, Solingen (DE)

( * ) Notice: Subject to any disclaimer, the term of this patent is extended or adjusted under 35 U.S.C. 154(b) by 0 days.

(21) Appl. No.: 15/673,817

(22) Filed: Aug. 10, 2017

(65) Prior Publication Data
US 2018/0044831 A1  Feb. 15, 2018

(30) Foreign Application Priority Data
Aug. 10, 2016 (DE) .......... 10 2016 114 843

(51) Int. Cl.
*D05B 79/00* (2006.01)
*D05B 15/00* (2006.01)
(Continued)

(52) U.S. Cl.
CPC ............ *D05B 79/00* (2013.01); *B60Q 3/54* (2017.02); *D01H 7/00* (2013.01); *D02G 3/26* (2013.01);
(Continued)

(58) Field of Classification Search
CPC ........ D05B 79/00; D05B 15/00; D05B 85/00; D05B 92/00; D01H 7/00; D02G 3/26; D02G 3/446; B60Q 3/00; B60Q 3/78
See application file for complete search history.

(56) References Cited

U.S. PATENT DOCUMENTS 4,210,255 A * 7/1980 Pan .................... B65D 51/1644
215/260
4,234,907 A * 11/1980 Daniel ................ A41D 27/085
139/420 R (Continued)

FOREIGN PATENT DOCUMENTS

CN 102066156 A 5/2011
CN 201890187 U 7/2011
(Continued)

OTHER PUBLICATIONS

English Machine Translation to Abstract of DE102013202222 Sep. 6, 2019.
(Continued)

*Primary Examiner* — Ismael Izaguirre
(74) *Attorney, Agent, or Firm* — Cantor Colburn LLP

(57) ABSTRACT

The invention relates to an arrangement comprising a visible seam, which is arranged in a sheet material part. The arrangement also includes a lighting apparatus, which is arranged beneath an underside of the sheet material part. The visible seam has an upper thread and a lower thread. The lower thread extends along the underside of the sheet material part in a direction (R). The upper thread has first thread portions along the upper side of the sheet material part and is guided, at stitch holes formed during the sewing process, through said stitch holes via second thread portions. By means of the lighting apparatus, emitted light passes into the second thread portions, into the stitch holes, and from there into the first thread portions. Some of the light propa- (Continued)

gates along the first thread portions, starting from an adjacent second thread portion, whereas another portion of the light exits from the first thread portion. In this way, the upper thread of the visible seam is illuminated.

20 Claims, 4 Drawing Sheets

(51) Int. Cl.
*D05B 85/00* (2006.01)
*D05B 93/00* (2006.01)
*D01H 7/00* (2006.01)
*D02G 3/26* (2006.01)
*B60Q 3/54* (2017.01)
*D02G 3/44* (2006.01)
*B60Q 3/78* (2017.01)

(52) U.S. Cl.
CPC ............ *D02G 3/446* (2013.01); *D05B 15/00* (2013.01); *D05B 85/00* (2013.01); *D05B 93/00* (2013.01); *B60Q 3/78* (2017.02)

(56) References Cited

U.S. PATENT DOCUMENTS

| | | | | |
|---|---|---|---|---|
| 6,146,006 A * | 11/2000 | Cross | ................... | A41D 13/01 |
| | | | | 362/103 |
| 6,450,678 B1 * | 9/2002 | Bayersdorfer | .......... | B60Q 3/54 |
| | | | | 362/488 |
| 6,851,844 B2 * | 2/2005 | Guy | ...................... | D03D 15/00 |
| | | | | 362/556 |
| 8,215,810 B2 * | 7/2012 | Welch, Sr. | .............. | B60R 13/00 |
| | | | | 362/488 |
| 8,317,247 B2 | 11/2012 | Beau et al. | | |
| 9,821,196 B2 * | 11/2017 | Lin | ........................ | A63B 43/06 |
| 2009/0316401 A1 * | 12/2009 | Choquet | .................. | B60Q 3/54 |
| | | | | 362/235 |
| 2013/0077338 A1 | 3/2013 | Wenzel et al. | | |

FOREIGN PATENT DOCUMENTS

| | | | |
|---|---|---|---|
| DE | 19724486 A1 * | 12/1998 | |
| DE | 19724486 A1 | 12/1998 | |
| DE | 202014000342 U | 6/2014 | |
| DE | 102013202222 A1 * | 8/2014 | |
| DE | 102013202222 A1 | 8/2014 | |
| DE | 102015103850 A1 | 9/2016 | |
| JP | 2009279999 A * | 12/2009 | |
| JP | 3178627 U * | 9/2012 | |
| JP | 2015074328 A | 4/2015 | |
| JP | 2017065355 A | 4/2017 | |
| WO | WO 2014036629 A1 * | 3/2014 | |

OTHER PUBLICATIONS

English Machine Translation to Abstract of DE19724486 Sep. 6, 2019.
English Machine Translation to Abstract of DE102015103850 Sep. 6, 2019.
Search Report for Application No. GB1712809.1 (3 pages) dated Sep. 6, 2019.
German Office Action for Application No. 10 2016 114 843.1; Date: Jun. 8, 2017.
English Translation German Office Action for Application No. 10 2016 114 843.1; Date: Jun. 8, 2017.
English Translation to CN Office Action for Application No. 201710676053.9; Date Issued: May 8, 2021.
CN Office Action for Application No. 201710676053.9; Date Issued: May 8, 2021.

* cited by examiner

ARRANGEMENT COMPRISING A VISIBLE SEAM AND A LIGHTING APPARATUS, USE THEREOF, AND METHOD FOR PRODUCING THE ARRANGEMENT

CROSS REFERENCE TO RELATED APPLICATIONS

This application claims priority under 35 U.S.C. § 119 to following German Patent application no. 10 2016 114 843.1, filed Aug. 10, 2016, the contents of which are incorporated herein by reference thereto.

TECHNICAL FIELD

The invention relates to an arrangement comprising a visible seam and a lighting apparatus for illuminating the visible seam. The invention additionally relates to the use of this arrangement and a method for production thereof.

BACKGROUND

Visible seams are used today in a wide range of ways in the processing of sheet material parts, such as textile material parts, leather material parts, imitation leather material parts, plastic material parts, etc.

The object of the invention is to improve the appearance of such visible seams and to extend the possibilities for use thereof.

SUMMARY

This object is achieved with an arrangement according to claim 1, a use of the arrangement according to claim 17, and a method for producing the arrangement according to claim 18.

A visible seam in the present application is understood to mean a seam that is at least partially visible on the end product. The visible seam can be just a stitching, or a combination of a stitching and a functional or connecting seam. The visible seam can thus be used not only as a stitching element, but also to connect a plurality of sheet material parts.

The arrangement according to the invention comprises a visible seam and a lighting apparatus. The visible seam is introduced into a sheet material and has an upper thread on the upper side of the sheet material part and a lower thread on the underside of the sheet material part. Any two-dimensional or three-dimensionally-shaped sheet material that can be handled or processed by sewing can be used as sheet material part. Such sheet materials can be, by way of example, a covering of a panel in a vehicle interior (door, fittings, roof lining, etc.) or a seat covering of a vehicle seat. The sheet material part can be, for example, a textile material (for example a fabric), leather, imitation leather, or a plastic film, etc.

The upper thread has first thread portions running along the upper side of the sheet material part. The first thread portions are adjoined by second thread portions of the upper thread, which run through stitch holes in the sheet material part from the upper side to the underside, or vice versa. Two second thread portions of the upper thread extend through each stitch hole. Beneath the stitch hole, the two second thread portions are connected to or interwoven with the lower thread of the visible seam.

The directly adjacent stitch holes of the visible seam are arranged at a distance from one another preferably ranging from 2 to 10 mm and in particular ranging from 4 to 6 mm. The length of the first thread portion of the upper thread corresponds to the distance between directly adjacent stitch holes.

The arrangement additionally comprises a lighting apparatus which has one or more light sources. The lighting apparatus is adapted to emit light at a plurality of light emission locations beneath the underside of the sheet material part. The light emission locations are arranged in at least one row on the underside in the direction of the visible seam. The light emission locations do not have to be arranged in a plane running at right angles to the sheet material part along the visible seam. The light emission locations can also be arranged offset to this plane in one or more rows beneath the underside of the sheet material. In a preferred exemplary embodiment, each light emission location is formed by a separate light source of the lighting apparatus, for example a semiconductor light source, such as a light-emitting diode.

The light emitted at the light emission locations is directed directly—or indirectly after one or more reflections—towards the second thread portions beneath each stitch hole and is coupled there into the second thread portions of the upper thread. The light propagates along the fibres or filaments of the second thread portions through the stitch hole to the upper side of the sheet material. At the upper side, the light is emitted partially from the subsequent first thread portion of the upper thread and is conducted along the first thread portion partially by reflections at the fibres or filaments of the upper thread. Some of the light exits at each location along the first thread portions. The amount of light propagating along a first thread portion thus decreases with increasing distance from a stitch hole. Since each first thread portion connects two stitch holes, a substantially constant brightness of the emitted light is nevertheless achieved along a first thread portion. This is because some of the light that is directed along the upper thread by the second thread portions of adjacent stitch holes is still present in the middle between two stitch holes. An emission of light that is relatively constant to an observer can thus be achieved along the first thread portions.

It is preferred if the distance between two directly adjacent light emission locations in the direction of the visible seam is different from the distance between directly adjacent stitch holes of the visible seam. It is thus possible to use a smaller number of lighting means or light-emitting diodes or light emission locations to achieve a constant illumination of the visible seam.

The second thread portions bear tightly against the sheet material within the stitch holes. A direct, straight emission of light through gaps between the two second thread portions and the peripheral wall of the sheet material part delimiting a stitch hole is substantially completely avoided. This results in the effect that merely the upper thread illuminates the visible seam. Light does not run past the upper thread upwardly through the stitch holes.

The direct emission of light through the stitch holes is also reduced or avoided by the lower thread, which extends beneath the stitch holes. In a preferred exemplary embodiment the cross-section or the thickness of the lower thread is greater than that of the upper thread. The lower thread can therefore cover the stitch hole, at least for the most part, at the underside of the sheet material.

The lower thread is constructed in such a way that the fibres or filaments of the lower thread primarily extend at right angles to the orientation of the stitch holes. The main direction of orientation of the fibres or filaments is therefore in the direction of extension of the lower thread and not transversely thereto. Light that contacts the lower thread from the light emission locations is reflected there. A greater light emission intensity in the region of the stitch holes at the upper side of the sheet material is thus also avoided.

In a preferred embodiment, the upper thread and/or the lower thread are/is embodied as a multi-filament yarn. Here, the twist of the upper thread embodied as a multi-filament yarn can be less than the twist of the lower thread embodied as a multi-filament yarn.

In order to achieve a light perception that is as constant as possible, it is advantageous if the twist of the upper thread embodied as a multi-filament yarn is as small as possible. For a suitable sewing behaviour and a uniform seam pattern, a minimum twist is required so that the filaments are sufficiently connected to one another. In one exemplary embodiment, the twist of the upper thread can lie in a range of 20-400 twists per meter.

For the lower thread, the same principles apply as for the upper thread. However, in the case of the lower thread, greater attention can be placed on the sewing behaviour, since the lower thread must not conduct any light along its extent. The twist of the lower thread embodied as a multi-filament yarn can preferably range from 20-400 twists per meter and can also be up to 1000 twists per meter.

The upper thread and/or the lower thread can be embodied as twine. The twine can contain a plurality of twisted multi-filament yarns. The number of steps in which in each case a plurality of filaments or twisted multi-filament yarns are twisted with one another can be selected here suitably. At the least, two such steps are provided in order to form the twine. In one exemplary embodiment, a plurality of filaments are twisted in the first step to form in each case a multi-filament yarn. In a second step, these multi-filament yarns are in turn twisted with one another. The twisting in the first step by way of example can be embodied as an S-twist, and the twisting in the second step can be embodied as a Z-twist, or vice versa. It is also possible to select the direction of twisting in both twisting steps to be in the same direction.

In the case of twine, a twisting of 20-400 twists per meter can be selected in each step. It is advantageous if, with twisting in the same direction in both steps, the sum of the twists in the two steps is at least 20 twists per meter and for the upper thread does not exceed 400 twists per meter and for the lower thread does not exceed 400 or up to 1000 twists per meter. With twisting directions in opposite directions in the first step and in the second step, it is preferred if the difference from the twist of the first step minus the twist of the second step ranges from 20-400 twists per meter for the upper thread and ranges from 20-400 twists per meter and at most up to 1000 twists per meter for the lower thread.

An auxiliary, such as wax, oil, etc., can be added to the upper thread and/or the lower thread in order to improve the sewing behaviour. It is also possible to add this auxiliary just to one or more yarns of a twine.

The twist of the upper thread and/or lower thread embodied as a multi-filament yarn is less than that which would be used for a conventional sewing yarn in order to attain a good thread cohesion and a good sewability. The smaller twist can improve the desired propagation of part of the coupled-in light along the upper thread.

It is advantageous if the upper thread and/or lower thread is coloured. In a preferred exemplary embodiment, the upper thread or the lower thread is white or appears to be white, since substantially all light wavelengths of visible light will be reflected. Other colours, such as blue, red, etc., can also be used. The upper thread and/or lower thread can be coloured by addition of pigments.

The upper thread preferably has a smaller mass per meter (tex) than the lower thread.

In a preferred embodiment, the first thread portions of the upper thread form a first thread layer. A second thread layer can be applied to this first thread layer by means of at least one additional thread, preferably by stitching. The orientation of the thread portions of the at least one additional thread in the second thread layer can be at right angles and/or obliquely and/or parallel to the first thread portions of the upper thread. The thread portions of the at least one additional thread are preferably arranged parallel to one another in the second thread layer. The threads of the second thread layer by way of example can form a letter, a number, a symbol, a logo or any other symbol to be illuminated. Backlit elements can thus be created in the sheet material part.

In a preferred embodiment, the sheet material part is sewn to a further sheet material part by means of a connecting seam, adjacently to the visible seam. Here, both sheet material parts can have a visible seam adjacently to the connecting seam. The sheet material parts are held together by the connecting seam. The at least one visible seam does not have a fixing function for holding together the two sheet material parts.

It is advantageous if at least one shielding means is provided at or adjacently to the connecting seam. By means of the at least one shielding means, the passage of light through the connecting seam or through the contact region between the two sheet material parts from the underside to the upper side can be at least reduced and in the ideal case completely prevented. Here, the at least one shielding means is at least partially impermeable for the emitted light wavelength. The shielding means can be formed by a non-transparent sheet, by a non-transparent close-meshed textile or lattice structure, or the like.

In one exemplary embodiment, the shielding means is formed by a seam tape or comprises a seam tape. The connecting seam by way of example can comprise two seam tapes, one on each of the two sheet material parts.

In a further preferred exemplary embodiment at least one supporting body is provided. In one exemplary embodiment, a supporting body is provided in the region of each visible seam. The supporting body is designed in each case to support an associated sheet material part at the underside. The supporting body by way of example can be formed from a resilient material. The supporting body is preferably produced from a material that is transparent for the emitted light wavelength.

It is advantageous if the shielding means is arranged or formed on the supporting body. By way of example, no or only a few structures or areas permeable to light can be provided or formed on the supporting body adjacently to the connecting seam. Corresponding microstructures or reflection areas can be provided in the supporting body, at which microstructures or reflection areas the impinging light is reflected and directed away from the connecting seam.

The lighting apparatus can comprise at least one delimiting face for the arrangement of the light emission locations. By way of example, it is advantageous if three delimiting faces adjoining one another form a channel delimited on three sides, for example a U-shaped or groove-shaped channel, which for example can be arranged beneath the associated visible seam. The cross-sectional shape of the channel can be selected arbitrarily and can also vary along the extent of the channel. The at least one delimiting face is preferably diffusely reflective and by way of example can be formed from a face with appropriate roughness, preferably a white face.

Since the lighting apparatus is disposed beneath the underside of the sheet material part, it is covered by the sheet material part in the use position or installed position and is not visible to the observer.

As explained, the above-described arrangement can be used advantageously in an interior of a vehicle, in particular a motor vehicle, aircraft, rail vehicle or watercraft. The sheet material part can therefore be used for example to provide a covering on the roof lining, in a door, or on the dashboard. The sheet material part can also be part of a seat covering.

When producing the arrangement, a visible seam is produced in the sheet material part with the aid of a sewing needle. The upper thread is drawn through a stitch hole by means of the sewing needle. The stitch hole is formed in the sheet material by the sewing needle. The needle cross-section is selected in such a way that a close fit of the two second thread portions within the stitch hole with the sheet material part, substantially without gaps, is produced by the resilient properties of the upper thread and the sheet material. The needle cross-section is in particular selected to be as small as possible. The lighting apparatus with the light emission locations is arranged beneath the underside of the sheet material. The light emission locations are preferably arranged at a distance from one another along the visible seam.

The distance between the light emission locations or the light sources and the lower thread is between 0 mm and 50 mm. With use of light-emitting diodes which are arranged at the light emission locations, the spacing is preferably 5-15 mm.

The cross-section of the sewing needle in the case of the method can be selected to be all the smaller, the lower is the resilience of the sheet material part.

Advantageous embodiments of the invention will become clear from the dependent claims, the description, and the drawings.

BRIEF DESCRIPTION OF THE DRAWINGS

Preferred embodiments of the invention will be explained in greater detail hereinafter on the basis of the accompanying drawings, in which.

DETAILED DESCRIPTION

Figure 1:
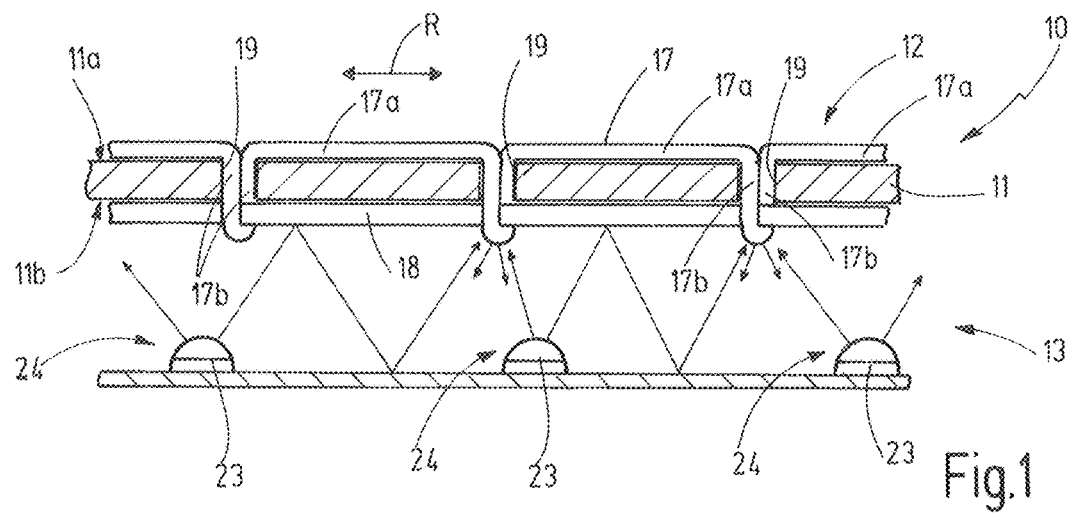
FIG. 1 shows a schematic, block diagram-like illustration of an exemplary embodiment of an arrangement comprising a visible seam in a sheet material part and a lighting apparatus.

FIG. 1 schematically shows an exemplary embodiment of an arrangement 10 comprising a sheet material part 11 with a visible seam 12 and a lighting apparatus 13. The sheet material part can be a flexible two-dimensional fabric which is provided with a visible seam 12 by sewing and which can be connected to other sheet material parts 11, in particular by sewing. The sheet material part by way of example can be a textile material part or can consist of leather, imitation leather, or plastic. The sheet material part 11 can also have a three-dimensionally shaped form. For example, it can be formed by a film which is brought into a desired three-dimensional form by means of a contour tool and is cured in this form. A three-dimensionally shaped sheet material of this type can be referred to as a moulded skin. The moulded skin can also have one or more visible seams. A moulded skin of this type can be produced alternatively also by means of a process of spraying with PU materials or in a rotational sintering process ("slushing"). Such three-dimensionally shaped sheet material parts can be provided with the visible seam in a state in which the three-dimensional form has already been produced.

The sheet material part 11 has an upper side 11a and an underside 11b. In use, the upper side 11a faces towards a user or observer. The underside 11b is not visible in the use state. A sheet material part 11 with a visible seam 12 is used by way of example in vehicle interiors of vehicles, for example in motor vehicles. For example, internal door trims, fittings or seats can be equipped with an arrangement 10, in which the sheet material part forms the visible top layer so to speak.

The visible seam 12 has an upper thread 17 and a lower thread 18. The lower thread 18 extends in a manner adjacent to the underside 11b of the sheet material part 11. The upper thread 17 is stabbed or pulled through the sheet material part 11 with the aid of a sewing needle. During this process, the sewing needle forms a stitch hole 19 in the sheet material part 11. The upper thread 12 is pulled from the upper side 11a through the stitch hole 19 to the underside 11b and, there, is connected to or interwoven with the lower thread 18. In so doing, the upper thread 17 forms a loop, through which the lower thread 18 passes.

The upper thread 17 has first thread portions 17a, which each extend along the upper side 11a of the sheet material part 11 between two directly adjacent stitch holes 19. At each stitch hole 19, the upper thread 17 forms two second thread portions 17b, wherein the two second thread portions 17b pass through the stitch hole 19 and are interwoven with the lower thread 18 at the underside 11b. At the upper side 11a, the second thread portions 17b each transition into a first thread portion 17a.

The visible seam 12 extends in a direction R along the sheet material part 11. Here, the direction R of the visible seam 12 is considered to be, at any point, the direction in which the first thread portions 17a extend between two stitch holes 19 or the direction in which the lower thread 18 extends. The direction R—in contrast to the schematic illustration in the drawings—can have an arbitrary course as considered over a multiplicity of stitch holes 19 and on the whole can form straight portions and/or curved portions.

The cross-section of the sewing needle for the upper thread 17 is selected such that this is smaller than, or at most the same size as the overall cross-section of the two second thread portions 17b guided through the stitch hole 19. Due to the resilience of the sheet material part 11 and the upper thread 17, the two second thread portions 17b can lie closely against one another once the sewing needle has been pulled out from the stitch hole 19, and it is possible that they do not leave a linear light gap passing through the stitch hole.

In accordance with the example, the cross-sectional area of the upper thread 17 is smaller than the cross-sectional area of the lower thread 18. The upper thread 17 has a greater fineness. In other words, the weight per meter of the upper thread 17 is smaller than the weight per meter of the lower thread 18. in FIG. 2 this has been illustrated by way of example in that the cross-sectional contours, assumed by way of example to be circular, are of different sizes and the diameter d1 of the upper thread 17 is smaller than the diameter d2 of the lower thread 18.

Figure 2:
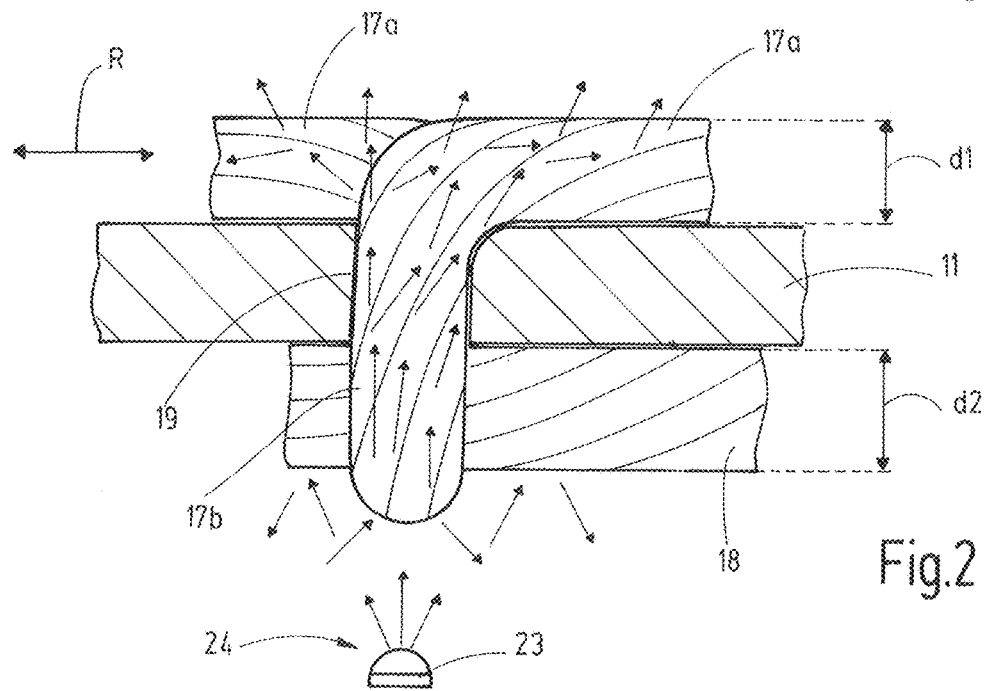
FIG. 2 shows a schematic basic diagram of the propagation of the light through part of an upper thread of the visible seam from FIG. 1.

As has been illustrated schematically in FIG. 2, both the upper thread 17 and the lower thread 18 are each embodied in accordance with the example as a multi-filament yarn. The individual filaments are twisted with one another in this case. The number of twists per meter in the case of the upper thread 17 can be lower than in the case of the lower thread 18. As is also illustrated schematically in FIG. 2, the twisted filaments of the lower thread 18 run primarily in a direction R in which the visible seam 12 extends.

Figure 10:
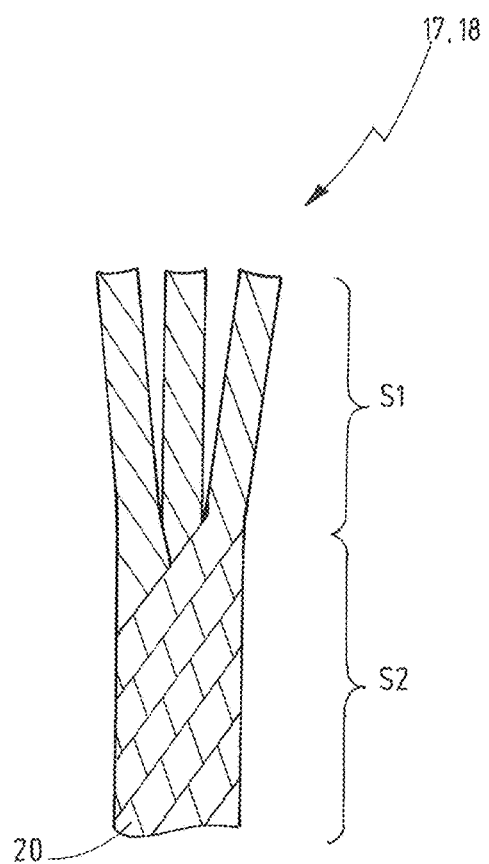
FIG. 10 shows a schematic illustration for producing a twine for an upper thread and/or lower thread in two steps.

FIG. 10 by way of example shows an exemplary embodiment for producing an upper thread 17 and/or a lower thread 18. Here, the thread 17, 18 is embodied as a twine 20. In accordance with the example, a plurality of multi-filament yarns with a first number of twists per meter are produced in a first step S1. In a second step S2, the multi-filament yarns produced in the first step are then connected to one another by twisting to form the twine 20. Here, the number of twists per meter in the first step S1 can be different from the number of twists in the second step S2. In addition, the direction of twisting in the two steps S1, S2 can be the same or different. In the first step S1, the multi-filament yarns can each have the same or also different directions of twist (S-twist and/or Z-twist). In accordance with the example, the multi-filament yarns are formed in the first step S1 by an S-twist and the produced multi-filament yarns are connected by a Z-twist in the second step S2 to form the twine. The number of twists per meter can lie for example in the range of 20-400 twists per meter in each step S1, S2. With twisting in the same direction in both steps S1, S2, the sum of the twists per meter for the upper thread preferably lies in the range of 20-400 twists per meter and for the lower thread 18 is preferably also up to 1000 twists per meter. With twisting in different directions in the two steps S1, S2, the difference of the twists in the first step minus the twists in the second step for the upper thread is in the range of 20-400 twists per meter and for the lower thread is 20-400 or up to 1000 twists per meter.

The lighting apparatus 13 has at least one light source, and in the exemplary embodiment a plurality of light sources 23. The electrical connection of the light sources 23 to a control unit for controlling or stipulating the light output is not illustrated in the drawings. Here, commercially available control means can be used. The at least one light source 23 is preferably a semiconductor light source, and in the exemplary embodiment is a light-emitting diode.

In the direction R of the visible seam 12, the lighting apparatus 13 forms a plurality of light emission locations 24 distanced from one another. Light is emitted at each light emission location 24 in the direction of the underside 11b of the sheet material part 11. In the preferred exemplary embodiment described here, a separate light source 23, and in accordance with the example a light-emitting diode, is arranged at each light emission location 24. The distance in the direction R between two directly adjacent light emission locations 24 is different in the exemplary embodiment from the distance between two directly adjacent stitch holes 19. Here, the distance between the light emission locations 24 can be larger than that between the stitch holes 19 as considered in the direction R.

The light sources 23 are also arranged at a distance from the underside 11b of the sheet material part 11. The distance between the light sources 23 in the direction R is dependent here on the light emission angle of the individual light sources 23 and on the distance from the underside 11b. It is preferably selected such that, in particular at each stitch hole 19, substantially the same radiation intensity is present at the underside 11b along the visible seam 12.

In contrast to the illustrated exemplary embodiments, it is also possible to select the distance between the light sources 23 and the stitch holes 19 in the direction R to be of equal size. Here, the light sources 23 are preferably not arranged directly in the extension of a stitch hole 19, but instead are arranged offset between two stitch holes 19, and in accordance with the example centrally therebetween. This measure can also result in the avoidance of a direct linear emission of light through a gap in a stitch hole 19 from the underside 11b to the upper side 11a.

By means of the lighting apparatus 13, the upper thread 17 is illuminated so to speak. The first thread portions 17a in the ideal case emit light over their entire course with the same radiation intensity. The arrows indicated in FIG. 2 schematically illustrate the light emitted by a light source 23. The light emitted at a light emission location 24 can contact a second thread portion 17b either directly or—as illustrated schematically in FIG. 1—can be reflected once or more before it contacts a second thread portion 17b and is coupled in there. The light coupled into the second thread portions 17b beneath a stitch hole 19 is reflected at the filaments of the upper thread 17. Due to the filaments running primarily in the direction of extension of the upper thread 17 or the corresponding thread portion 17a, 17b, some of the light propagates in the direction in which the upper thread 17 runs. Another portion of the light exits from the upper thread 17 at the upper side 11b into the first thread portions 17a. The upper thread 17 emits light and lights up. Starting from a stitch hole 19, the light propagating along a first thread portion 17a of the upper thread 17 decreases. Since light is coupled into a first thread portion 17a by two adjacent stitch holes 19 and the second thread portions 17b provided there, the light is added in a central region of the first thread portion 17a between two stitch holes 19. An overall uniform radiation intensity of the emitted light from a first thread portion 17a can thus be achieved. In the exemplary embodiment, the distance between two adjacent stitch holes 19 is selected in accordance with the example to be less than 10 mm and preferably less than 6 mm. the distance in the direction R between two stitch holes 19 is preferably at least 2 mm and preferably at least 4 or 5 mm.

The lower thread 18 is disposed beneath each stitch hole 19. Due to a larger diameter or cross-section than that of the upper thread 17, the lower thread 18 covers the stitch hole 19 completely or for the most part. As a result of this measure, light is also prevented from passing directly straight through a gap in the stitch hole 19. If light were to pass through a light gap of a stitch hole 19 to the upper side, the stitch hole 19 itself would then appear to be illuminated, and not only the upper thread 17. A visual impression of this type should be avoided.

Due to the filaments of the lower thread 18, this is additionally diffusely reflective. The orientation of the filaments of the lower thread 18 also reduces or blocks the direct emission of light through a stitch hole 19.

It should be noted at this juncture that, in contrast to the present preferred exemplary embodiment, the upper thread 17 and/or lower thread 18 can additionally also comprise fibres or can comprise fibres instead of filaments.

Figure 3:
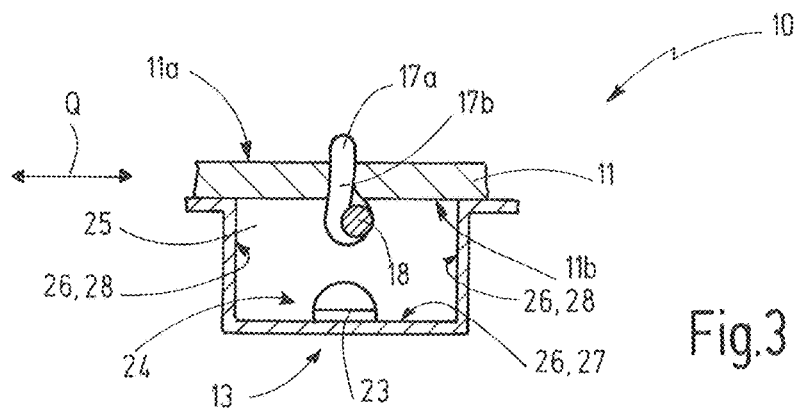
FIG. 3 shows a highly schematic basic illustration of an exemplary embodiment of the arrangement in the direction of the visible seam, FIGS. 4-6 each show a basic illustration of an exemplary embodiment of an arrangement with two sheet material parts connected to one another at a connection location by means of a connecting seam.
Figure 4:
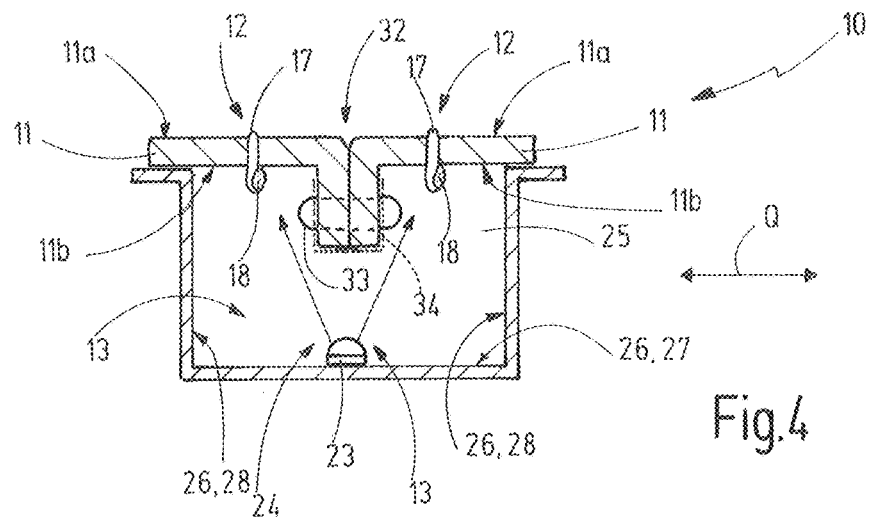

FIGS. 3 and 4 schematically show an embodiment in which the light emission locations 24 or the light sources 23 are arranged in a groove-like channel 25. The channel 25 is open towards the underside 11b of the sheet material part 11. It has three delimiting faces 26. The bottom face 27 opposite the underside 11b constitutes a delimiting face 26, which at the same time is designed as a mounting face for the light sources 23. The bottom face 27 is adjoined on opposite sides in each case by a side face 28, which side faces each form a further delimiting face 26. The two side faces 28 face towards one another and are arranged in a transverse direction Q, at right angles to the direction R, at a distance from one another on opposite sides of the visible seam 12 or the lower thread 18.

The design of the channel 25 is in principle freely selectable and can deviate from the illustration. The channel 25 can have an arbitrary cross-section which is open towards the underside 11b of the sheet material part 11 and which can also vary along the channel 25.

At least one of the provided delimiting faces 26 is diffusely reflective. It can have a corresponding roughness. The at least one delimiting face 26 is preferably light, for example white or metallic grey.

Figure 5:
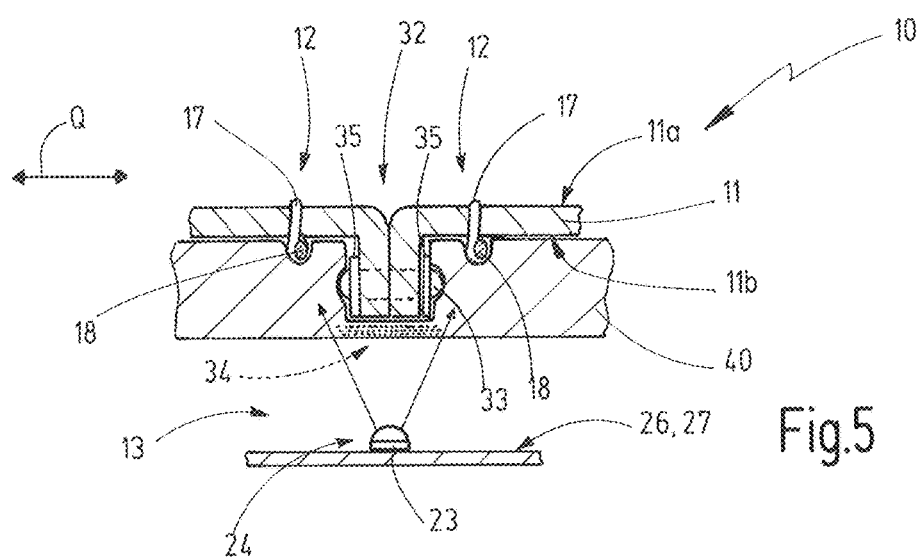
Figure 6:
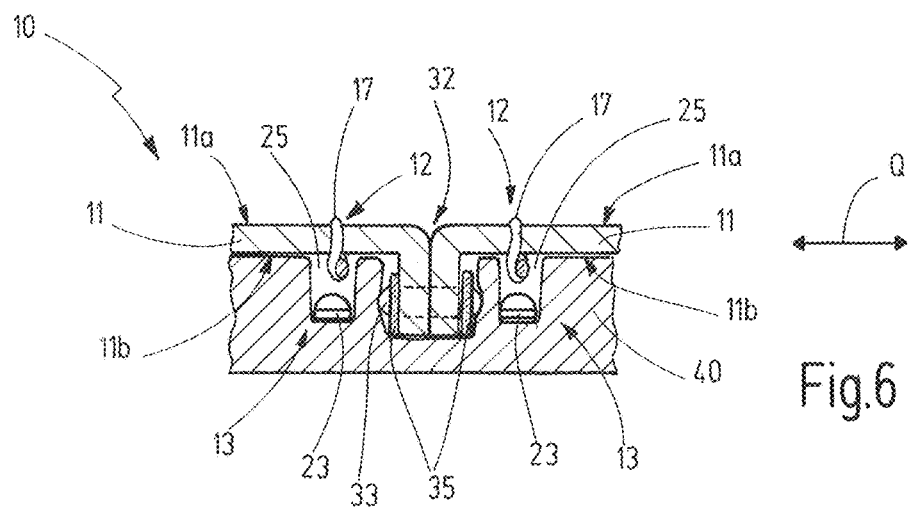

In the exemplary embodiments illustrated in FIGS. 4-6, two sheet metal parts 11 are connected to one another at a connection location 32. For this purpose, an edge-side portion of each sheet material part 11 is folded down away from the upper side 11a, and the two sheet material parts 11 are placed against one another by means of these edge-side portions and are connected there. In the exemplary embodiment a connecting seam 33 is provided in these edge-side portions. Additionally or alternatively, the two sheet material parts 11 could also be glued or otherwise connected to one another at the connection location 32. In accordance with the example, a connection by means of a connecting seam 33 is provided exclusively.

A sheet material part 11 can also have a visible seam applied outside a connection location 32 as decoration, for example in a three-dimensionally formed moulded skin.

In the illustrated exemplary embodiments, a visible seam 12 is provided in each sheet material part 11 adjacently to the connecting seam 33 in the transverse direction Q. The connecting seam 33 or the connection location 32 and the visible seams 12 extend in each case substantially parallel to one another in the direction R.

In the exemplary embodiments according to FIGS. 4 and 5, both visible seams 12 are assigned a joint lighting apparatus 13. Here, a single row of light emission locations 24 or light sources 23 can be provided in the direction R. The light thereof irradiates in the direction of both visible seams 12. Alternatively, it is also possible to assign each visible seam 12 a separate lighting apparatus 23, said apparatuses having their own light emission locations 24 or light sources 23. Such an embodiment is illustrated by way of example in FIG. 6.

In order to avoid a passage of light at the connection location 32 and in accordance with the example at the connecting seam 33, at least one shielding means 34 can be provided there. This shielding means 34 serves to prevent or at least reduce the passage of light at the connecting seam 33 or the contact face of the two sheet material parts 11 at the connection location 32. The at least one shielding means 34 is illustrated merely in a highly schematised and dashed manner in FIG. 4. By means of the at least one shielding means 34, the entry of light into the stitch holes of the connecting seam 33 can be reduced or blocked. In addition, the entry of light into the region of the contact face between the two sheet material parts 11 at the connection location 32 can be blocked or reduced.

A shielding means 34 can be formed by way of example by a seam tape 35 or may comprise a seam tape 35 of this type. In the case of the exemplary embodiment illustrated schematically in FIG. 5, a seam tape 35 is provided along the connecting seam 33 on both sheet material parts 11 and reduces or blocks the entry of light into the stitch holes of the connecting seam.

In the case of a further embodiment of the arrangement 10, as illustrated in FIG. 5, at least one supporting body 40 is provided. In the exemplary embodiment illustrated in FIG. 5, the supporting body 40 is produced from a material that is permeable for the light emitted by the lighting apparatus 13. The at least one supporting body 40 supports the assigned sheet material part 11 on the underside 11b thereof. In the region of the connection location 32, the two sheet material parts 11 can be assigned a common supporting body 40 or alternatively can each be assigned their own supporting body 40.

A shielding means 34 is provided in the gap between the connection location 32 or the connecting seam 33 and the light emission locations 24 or the light sources 23, and in accordance with the example is arranged on the supporting body 40 or is formed on the supporting body 40. By way of example, the region of the supporting body 40 beneath the connection location 32 or the connecting seam 33 can be formed by a microstructure and/or by a colouring and/or by application of a material hindering or preventing the passage of light, as shielding means 34. An embodiment of this type is illustrated in FIG. 5 in a highly schematised manner by the dashed region of the supporting body 40. This region is dimensioned and positioned such that light emitted by the light emission locations 24 does not impinge on the connection location 32 between the sheet textile parts 11, but the emission of light is enabled, unhindered, in the direction of the visible seams 12.

The channel 25 for arranging the light emission locations 24 or the light sources 23 can also be formed in the supporting body 40. Such an embodiment is illustrated by way of example in FIG. 6. There, a channel 25 is provided beneath each visible seam 12. It is also possible to form the channel 25 in the supporting body 40 if both visible seams 12 are assigned a common lighting apparatus 13, as is illustrated by way of example in the exemplary embodiments according to FIGS. 4 and 5. The channel is then preferably positioned between the two visible seams 12 in the transverse direction Q.

In the exemplary embodiment illustrated in FIG. 6, the supporting body 40 can be produced from any material. The material does not necessarily have to be transparent for the emitted light wavelength. The delimiting faces 26 delimiting the channels 25 on three sides, these delimiting faces being formed by the supporting body 40 itself in accordance with the example, are preferably diffusely reflective, as has been explained on the basis of the channel 25 according to FIGS. 3 and 4. Here, the light can leave the channel 25 merely at the underside 11b of the corresponding sheet material part 11 and consequently in the direction of the visible seam 12. Additional shielding means in the region of the connection location 32 therefore are not necessary. Seam tapes 35 can still be provided for reasons relating to the sewing process.

Figure 9:
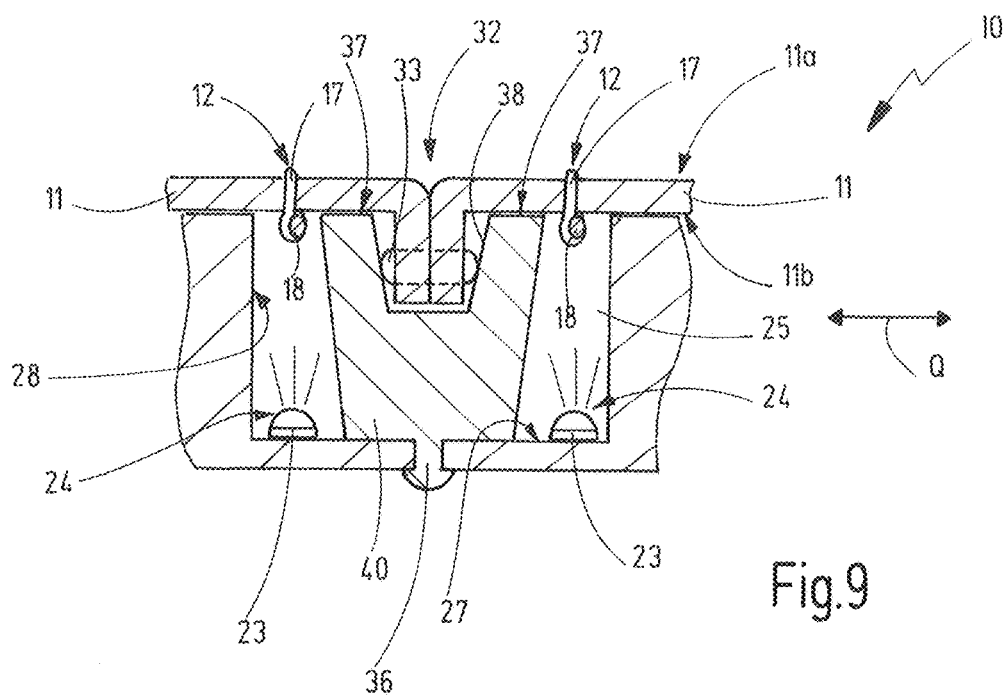
FIG. 9 shows a basic illustration of an exemplary embodiment of an arrangement with two sheet material parts connected to one another at a connection location by means of a connecting seam.

A further exemplary embodiment of the arrangement 10 is illustrated in FIG. 9. A plurality of light emission locations 24 or light sources 23 are arranged beneath each of the two visible seams 12. The supporting body 40 is arranged within the channel 25 between these two arrangements of light emission locations 24 or light sources 23 and divides the channel 25 into two channel portions, which are separated at a distance from one another in the transverse direction Q by the supporting body 40. The supporting body 40 is fastened to, or on the bottom face 27. The fastening can be implemented for example in a frictionally engaged and/or positively engaged and/or integrally bonded manner. In the case of the exemplary embodiment, the supporting body 40 has a plurality of pins 36, which are arranged at a distance from one another in the direction of the channel 25 and which each protrude through an assigned hole in the bottom of the body forming the channel 25. On the outside, the pin 36 can be shaped to have a widened head, whereby a positively engaged and optionally additionally integrally bonded connection can be created between the supporting body 40 and the channel bottom.

On the side opposite the bottom or the bottom face 27, which side faces the underside 11b of the sheet material parts 11, the supporting body 40 has a supporting face 37. A region of the sheet material part 11 rests on the supporting face 37. A gap remains between each side face 28 and the supporting body 40, said gap having a sufficiently small dimension in the transverse direction Q so that, when the sheet material part 11 is loaded, a sufficiently good supporting effect is provided and the sheet material part 11 is not pushed into the channel 25 through the gap or is only slightly pushed in this way.

In order to receive the two end portions of the sheet material parts 11 in the region of the connection location 32, a receiving recess 38 is provided, which extends at right angles to the transverse direction Q along the extent of the channel 25 through the supporting body 40. There, the end portions are received with the connecting seam 33. The receiving recess 38 can have any cross-section adapted thereto. The receiving recess 38 divides the supporting face 37 into two face regions. Between each side face 28 and the supporting body 40, there is provided the corresponding visible seam 12 in the sheet material parts 11 in the region of the remaining gap.

Depending on the course of the connection location 32 or the visible seams 12, a plurality of separate supporting bodies 40 can be arranged adjacently. The supporting bodies 40 can extend along the channel 25 in a straight line and/or in a curved fashion and consequently in a manner adapted to the course of the connection location 32 and the visible seams 12.

Figure 7:
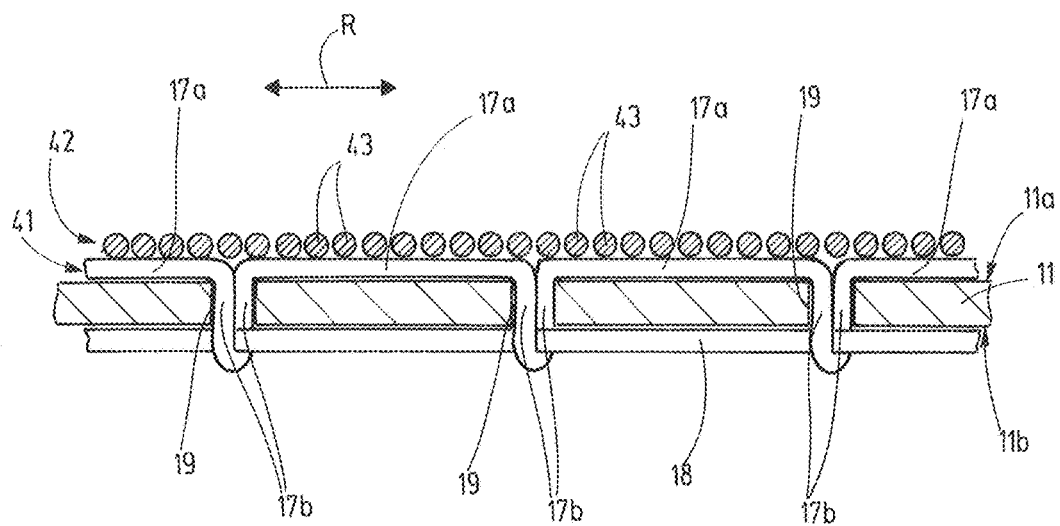
FIG. 7 shows a schematic basic illustration of a further exemplary embodiment of an arrangement with two thread layers arranged one above the other on the upper side of the sheet material part.
Figure 8:
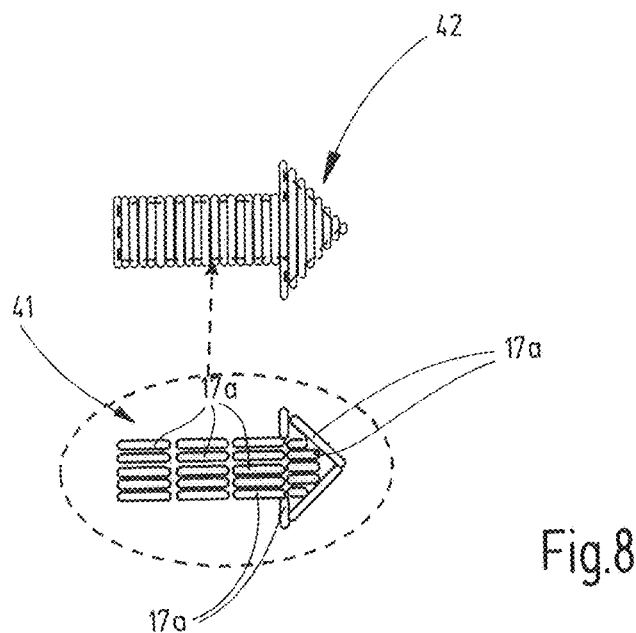
FIG. 8 shows an exemplary schematic illustration of a symbol formed by a second, upper thread layer.

FIGS. 7 and 8 show a further variant or possible use of the arrangement 10. The first thread portions 17a of the upper thread 17 of a visible seam 12 here form a first thread layer 41, which is directly adjacent to the upper side 11a of the sheet material part 11 or rests directly thereon. A second thread layer 42 can be arranged on the first thread layer 41.

The second thread layer 42 consists of portions of one or more additional threads 43, which for example form the second thread layer 42 by being stitched above the first thread layer 41. The at least one additional thread 43 is preferably connected to the sheet material part 11 at the edge adjacent to the first thread layer 41. This provides the possibility to emit the light indirectly via the first thread portions 17a and the second thread layer 42. The first thread layer 41 with the first thread portions 17a can be arranged for optimisation of a uniform emission of light and for example the length, number, orientation and distribution of the first thread portions 17a can be selected accordingly. Due to the additional second thread layer 42, a second layer 42 conveying a good optical impression—even in the non-illuminated state—can be stitched with additional threads 42. By way of example, lettering, logos, symbols, numbers, letters or any combination thereof can be formed. An arrow symbol is stitched in FIG. 8 by the additional threads 43, merely by way of example. The first thread layer 41 is disposed beneath these additional threads 43. The arrow symbol consequently can be illuminated. The described exemplary embodiments of the arrangement 10 are therefore also suitable for the presentation of illuminated symbols, characters, letters, numbers, logos, etc.

The invention relates to an arrangement 10 having a visible seam 12, which is arranged in a sheet material part 11. The arrangement 10 also includes a lighting apparatus 13, which is arranged beneath an underside 11b of the sheet material part 11. The visible seam 12 has an upper thread 17 and a lower thread 18. The lower thread 18 extends in a direction R along the underside 11b of the sheet material part 11. The upper thread 17 has first thread portions 17a along the upper side 11a of the sheet material part 11 and, when sewn, is guided at stitch holes 19, through said holes via second thread portions 17b. By means of the lighting apparatus 13, emitted light passes into the second thread portions 17b, into the stitch holes 19, and from there into the first thread portions 17a. Some of the light propagates along the first thread portions 17a starting from an adjacent second thread portion 17b, whereas another portion of the light exits from the first thread portion 17a. In this way, the upper thread 17 of the visible seam 12 is illuminated.

LIST OF REFERENCE SIGNS 10 arrangement
11 sheet material part
11a upper side of the sheet material part
11b underside of the sheet material part
12 visible seam
13 lighting apparatus
17 upper thread
17a first thread portion
17b second thread portion
18 lower thread
19 stitch hole
20 twine
23 light source
24 light emission location
25 channel
26 delimiting face
27 bottom face
28 side face
32 connection location
33 connecting seam
34 shielding means
35 seam tape 36 pin
37 supporting face
38 receiving recess
40 supporting body
41 first thread layer
42 second thread layer
43 additional thread
d1 diameter of the upper thread
d2 diameter of the lower thread
R direction of the visible seam
S1 first step
S2 second step
Q transverse direction

What is claimed is:

1. An arrangement comprising a visible seam and a lighting apparatus,
   wherein the visible seam comprises an upper thread and a lower thread, wherein the upper thread comprises first thread portions extending along an upper side of a sheet material part and second thread portions, which run through stitch holes through the sheet material part and which are each interlaced with the lower thread at an underside of the sheet material part beneath each stitch hole,
   wherein the lighting apparatus comprises one or more light sources and is adapted to emit light at a plurality of light emission locations beneath the underside of the sheet material part,
   wherein the lighting apparatus is adapted to couple the light emitted at the plurality of light emission locations into the second thread portions of the upper thread beneath the stitch holes, the light emitted at the plurality of light emission locations propagates along the second thread portions of the upper thread and, starting from the second thread portions propagates partially along adjacent first thread portions of the upper thread and is diffusely emitted in part by the first thread portions, wherein the upper thread comprises a plurality of multi-filament yarns wherein each one of the plurality of multi-filament yarns include filaments twisted together.

2. An arrangement comprising a visible seam and a lighting apparatus,
   wherein the visible seam comprises an upper thread and a lower thread, wherein the upper thread comprises first thread portions extending along an upper side of a sheet material part and second thread portions, which run through stitch holes though the sheet material part and which are each interlaced with the lower thread at an underside of the sheet material part beneath each stitch hole,
   wherein the lighting apparatus comprises one or more light sources and is adapted to emit light at a plurality of light emission locations beneath the underside of the sheet material part,
   wherein the lighting apparatus is adapted to couple the light emitted at the plurality of light emission locations into the second thread portions of the upper thread beneath the stitch holes, the light emitted at the plurality of light emission locations propagates along the second thread portions of the upper thread and, starting from the second thread portions propagates partially along adjacent first thread portions of the upper thread and is diffusely emitted in part by the first thread portions, wherein the upper thread and the lower thread each comprise a plurality of multi-filament yarns wherein each one of the plurality of multi-filament yarns include filaments twisted together.

3. The arrangement according to claim 1, wherein the plurality of multi-filament yarns of the upper thread and the lower thread are twisted together to form a twine and wherein a twist of the upper thread is in a range of 20 to 400 twists per meter.

4. The arrangement according to claim 3, wherein a twist of the upper thread is less than a twist of the lower thread.

5. An arrangement comprising a visible seam and a lighting apparatus,
   wherein the visible seam comprises an upper thread and a lower thread, wherein the upper thread comprises first thread portions extending along an upper side of a sheet material part and second thread portions, which run through stitch holes though the sheet material part and which are each interlaced with the lower thread at an underside of the sheet material part beneath each stitch hole,
   wherein the lighting apparatus comprises one or more light sources and is adapted to emit light at a plurality of light emission locations beneath the underside of the sheet material part,
   wherein the lighting apparatus is adapted to couple the light emitted at the plurality of light emission locations into the second thread portions of the upper thread beneath the stitch holes, the light emitted at the plurality of light emission locations propagates along the second thread portions of the upper thread and, starting from the second thread portions propagates partially along adjacent first thread portions of the upper thread and is diffusely emitted in part by the first thread portions, wherein the upper thread has a smaller cross-section that the lower thread.

6. The arrangement according to claim 1, wherein the first thread portions of the upper thread form a first thread layer, and a second thread layer is provided on the first thread layer.

7. The arrangement according to claim 1, wherein the sheet material part is sewn to a further sheet material part at a connecting seam adjacent to the visible seam.

8. The arrangement according to claim 7, wherein the sheet material part and the further sheet material part each have a visible seam adjacent to the connecting seam.

9. The arrangement according to claim 7, wherein at least one shielding means is provided adjacent to the connecting seam and the at least one shielding means reduces passage of light at the connecting seam.

10. The arrangement according to claim 9, wherein the at least one shielding means comprises a seam tape.

11. The arrangement according to claim 1, wherein at least one supporting body is provided and supports an assigned sheet material part at the underside of the sheet material part.

12. The arrangement according to claim 11, wherein the sheet material part is sewn to a further sheet material part at a connecting seam adjacent to the visible seam and wherein at least one shielding means is provided adjacent to the connecting seam and the at least one shielding means reduces passage of light at the connecting seam, and wherein the at least one shielding means comprises a seam tape arranged on the at least one supporting body.

13. The arrangement according to claim 1, wherein the plurality of light emission locations are each formed by a separate light source.

14. The arrangement according to claim 1, wherein the lighting apparatus comprises at least one diffusely reflective delimiting face along the plurality of light emission locations.

15. The arrangement according to claim 1, wherein the arrangement is located in an interior of a vehicle.

16. A method for producing an arrangement according to claim 1, comprising the following steps.
    producing the visible seam, wherein the upper thread is pulled from the upper side of the sheet material part through the stitch holes formed by using a sewing needle, and wherein a cross-sectional area of the sewing needle is smaller than twice a cross-sectional area of the upper thread,
    providing the lighting apparatus having the plurality of light emission locations beneath the underside of the sheet material part.

17. The method according to claim 16, wherein a resiliency of the sheet material part is reduced when the cross-sectional area of sewing needle is smaller than twice the cross-sectional area of the upper thread.

18. The arrangement according to claim 1, wherein the plurality of multi-filament yarns of the upper thread are twisted together to form a twine.

19. The arrangement according to claim 18, wherein a twist of the plurality of multi-filament yarns of the upper thread is up to 1000 twists per meter.

20. The arrangement according to claim 18, wherein a twist of the plurality of multi-filament yarns of the upper thread is less than a twist of the lower thread.

* * * * *